United States Patent Office.

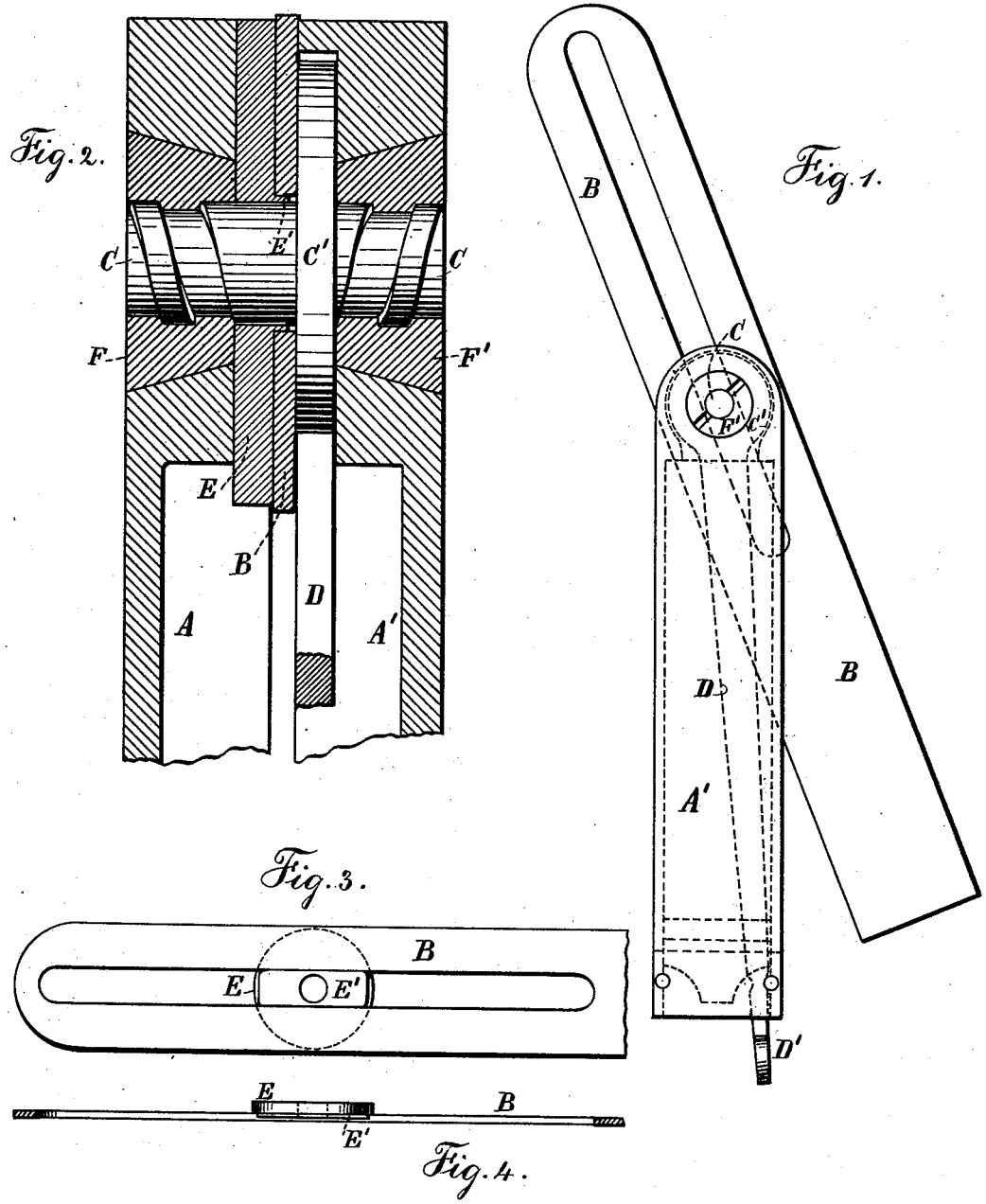

RANDOLPH HAYDEN, OF HADDAM, CONNECTICUT.

CARPENTER'S BEVEL.

SPECIFICATION forming part of Letters Patent No. 392,427, dated November 6, 1888.

Application filed April 9, 1888. Serial No. 270,048. (No model.)

*To all whom it may concern:*

Be it known that I, RANDOLPH HAYDEN, of Haddam, in the county of Middlesex and State of Connecticut, have invented an Improvement in Carpenters' Bevels, of which the following is a specification.

My invention relates to carpenters' bevels in which, after the slotted blade has been set to the desired angle for use, the same can be clamped and held securely in place.

My invention consists in the combination, with the usual hollow two-part handle and stock and the slotted blade, of a screw having right and left hand threads, and to which a lever is secured, conical nuts upon the ends of the screw, and a friction-ring by means of which pressure is applied by the moving of the lever to secure the slotted blade at any desired position.

In the drawings, Figure 1 is a side elevation of my improved bevel. Fig. 2 is a sectional elevation, in larger size, at the pivotal point of the blade. Fig. 3 is an elevation of part of the slotted blade and friction-ring; and Fig. 4 is an edge view of the ring, the blade being shown in section.

The hollow handle or stock is preferably made of metal in two parts, A A', to fit flatly together, leaving a slot for the movement of the blade. The slotted blade B is of the usual form, and there is a screw, C, with right and left hand threads of quick pitch, said screw being attached to the hub C', from which hub projects the lever D, having the thumb-piece D' upon its outer lower end. The friction-ring E has a raised portion, E', with parallel sides, which raised portion is received within the slot of the blade B, the blade lying against the flat face of the ring E and the ring and blade turning together. The screw C at one side of the hub C' passes through an opening in the friction-ring E and raised portion E', and upon the ends of the screw C are the conical clamping-nuts F F', which are received within the conical openings in one end of each part of the hollow handle or stock.

In Fig. 1 the lever D is shown in a position at which the blade B is free to be rotated with the ring E and to be placed at any desired angle for use.

To clamp the blade securely in place, it is only necessary to grasp the hollow handle with one hand and the thumb-piece D' with the other hand and move the lever D from one side of the handle to the other, which operation draws the conical nuts F F' and parts A A' of the handle slightly together, compressing the blade B between the ring E and hub C' and firmly binding it in place. When the handle D' is replaced to the position shown in Fig. 1, the parts are released again and the blade B is free to be again set at any other angle.

I am aware that heretofore carpenters' bevels have been made wherein the slotted blade could be clamped rigidly to place; but in these cases there was no right and left hand screw rotated by a lever by which the clamping was accomplished, as in my invention.

I claim as my invention—

1. The combination, in a carpenter's bevel, with the two-part hollow handle and slotted blade, of the screw C, having right and left hand threads, and a lever connected therewith by which the screw is rotated to clamp the slotted blade in position between the two-part hollow handle, substantially as set forth.

2. The combination, with the two-part hollow handle and the slotted blade, of the screw C, having right and left hand threads, the hub C', and lever D, connected with said screw, a friction-ring, E, and conical nuts F F', substantially as and for the purposes set forth.

Signed by me this 2d day of April, A. D. 1888.

RANDOLPH HAYDEN.

Witnesses:
EDWARD W. HAZEN,
A. H. HAYDEN.